United States Patent
Lim et al.

(10) Patent No.: US 10,321,462 B2
(45) Date of Patent: Jun. 11, 2019

(54) METHOD AND APPARATUS FOR SETTING GROUP-BASED CONNECTION

(71) Applicant: Samsung Electronics Co., Ltd., Suwon-si, Gyeonggi-do (KR)

(72) Inventors: Han Na Lim, Seoul (KR); Sang Soo Jeong, Suwon-si (KR); Song Yean Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/433,475

(22) PCT Filed: Oct. 8, 2013

(86) PCT No.: PCT/KR2013/009007
§ 371 (c)(1),
(2) Date: Apr. 3, 2015

(87) PCT Pub. No.: WO2014/058219
PCT Pub. Date: Apr. 17, 2014

(65) Prior Publication Data
US 2015/0249978 A1    Sep. 3, 2015

(30) Foreign Application Priority Data

Oct. 8, 2012    (KR) .................... 10-2012-0111475

(51) Int. Cl.
*H04W 72/04*    (2009.01)
*H04W 76/12*    (2018.01)
(Continued)

(52) U.S. Cl.
CPC ..... *H04W 72/048* (2013.01); *H04W 72/0413* (2013.01); *H04W 72/0453* (2013.01);
(Continued)

(58) Field of Classification Search
CPC ........... H04W 72/0413; H04W 72/048; H04W 76/02; H04W 76/021
See application file for complete search history.

(56) References Cited

U.S. PATENT DOCUMENTS 8,514,756 B1 *   8/2013   Ramachandra ..... H04L 61/2069
                                                    370/310
8,780,814 B2    7/2014   Song et al.
(Continued)

FOREIGN PATENT DOCUMENTS

AU    2009-231602 A1    10/2009
AU    2010321416 A1    6/2012
(Continued)

*Primary Examiner* — Gregory B Sefcheck
*Assistant Examiner* — Jael M Ulysse
(74) *Attorney, Agent, or Firm* — Jefferson IP Law, LLP (57) ABSTRACT

The present invention relates a method and apparatus for setting a group-based connection. A connection setting method for a network entity according to one embodiment of the present invention includes the steps of: receiving a request including at least one packet filter from a terminal; obtaining a group identifier corresponding to the packet filter by using the packet filter; when a group bearer corresponding to the group identifier does not exist, generating a group bearer corresponding to the group identifier; and performing allocation such that communication corresponding to the request is performed through the generated group bearer. According to one embodiment of the present invention, a service can be efficiently provided to a terminal.

18 Claims, 6 Drawing Sheets

(51) Int. Cl.
*H04W 28/06* (2009.01)
*H04W 76/11* (2018.01)
(52) U.S. Cl.
CPC ............ *H04W 76/12* (2018.02); *H04W 28/06* (2013.01); *H04W 76/11* (2018.02)

(56) References Cited

U.S. PATENT DOCUMENTS

| | | | | |
|---|---|---|---|---|
| 9,055,557 B1* | 6/2015 | Bayar | ............... | H04W 76/10 |
| 2002/0114293 A1* | 8/2002 | Madour | ............... | H04L 69/16 |
| | | | | 370/329 |
| 2005/0286540 A1* | 12/2005 | Hurtta | ............... | H04M 7/006 |
| | | | | 370/401 |
| 2006/0106750 A1* | 5/2006 | Smith | ............... | H04L 12/56 |
| 2008/0254768 A1* | 10/2008 | Faccin | ............... | H04W 76/02 |
| | | | | 455/411 |
| 2009/0016344 A1* | 1/2009 | Hu | ............... | H04L 47/41 |
| | | | | 370/389 |
| 2009/0052384 A1* | 2/2009 | Zisimopoulous | ....... | H04L 47/14 |
| | | | | 370/329 |
| 2009/0129342 A1* | 5/2009 | Hwang | ............... | H04W 36/0022 |
| | | | | 370/331 |
| 2009/0225719 A1* | 9/2009 | Zhi | ............... | H04W 72/12 |
| | | | | 370/329 |
| 2009/0252132 A1* | 10/2009 | Song | ............... | H04W 76/025 |
| | | | | 370/338 |
| 2009/0290540 A1* | 11/2009 | Cherian | ............... | H04L 47/10 |
| | | | | 370/328 |
| 2009/0304015 A1* | 12/2009 | Willars | ............... | H04L 47/803 |
| | | | | 370/412 |
| 2010/0027448 A1* | 2/2010 | Puthiyandyil | ....... | H04W 76/025 |
| | | | | 370/310 |
| 2010/0034083 A1* | 2/2010 | Prakash | ............... | H04W 28/18 |
| | | | | 370/230.1 |
| 2010/0074109 A1* | 3/2010 | Klingenbrunn | ....... | H04W 36/16 |
| | | | | 370/230 |
| 2011/0103310 A1* | 5/2011 | Stojanovski | ............ | H04L 12/66 |
| | | | | 370/328 |
| 2011/0110379 A1 | 5/2011 | Lim et al. | | |
| 2011/0122885 A1* | 5/2011 | Hedman | ............ | H04L 65/1016 |
| | | | | 370/412 |
| 2011/0145319 A1* | 6/2011 | Dolan | ............... | H04L 47/72 |
| | | | | 709/203 |
| 2011/0167471 A1 | 7/2011 | Riley et al. | | |
| 2011/0170411 A1* | 7/2011 | Wang | ............... | H04W 76/10 |
| | | | | 370/235 |
| 2011/0170506 A1* | 7/2011 | Zisimopoulous | ....... | H04L 47/14 |
| | | | | 370/329 |
| 2011/0202485 A1* | 8/2011 | Cutler | ............... | H04L 12/14 |
| | | | | 706/12 |
| 2011/0202491 A1* | 8/2011 | Pandya | ............... | H04L 12/14 |
| | | | | 706/47 |
| 2011/0274042 A1* | 11/2011 | Diachina | ............... | H04W 4/005 |
| | | | | 370/328 |
| 2011/0317557 A1* | 12/2011 | Siddam | ............... | H04W 28/16 |
| | | | | 370/232 |
| 2011/0317558 A1* | 12/2011 | Siddam | ............... | H04W 28/16 |
| | | | | 370/235 |
| 2011/0317709 A1* | 12/2011 | Cuervo | ............... | H04M 15/66 |
| | | | | 370/401 |
| 2012/0002541 A1* | 1/2012 | Lee | ............... | H04W 28/22 |
| | | | | 370/230 |
| 2012/0008601 A1* | 1/2012 | Zisimopoulos | ... | H04W 72/1268 |
| | | | | 370/336 |
| 2012/0033623 A1* | 2/2012 | Chu | ............... | H04W 76/02 |
| | | | | 370/329 |
| 2012/0033679 A1* | 2/2012 | Horn | ............... | H04W 48/10 |
| | | | | 370/401 |
| 2012/0039332 A1* | 2/2012 | Jackowski | ............... | H04L 69/32 |
| | | | | 370/389 |
| 2012/0059943 A1* | 3/2012 | Castro Castro | ......... | H04L 12/14 |
| | | | | 709/227 |
| 2012/0082098 A1* | 4/2012 | Oprescu-Surcobe | ....................... | |
| | | | | H04L 65/00 |
| | | | | 370/329 |
| 2012/0099578 A1* | 4/2012 | Aramoto | ................ | H04W 8/02 |
| | | | | 370/338 |
| 2012/0102174 A1* | 4/2012 | Zhou | ............... | H04L 12/14 |
| | | | | 709/223 |
| 2012/0106391 A1* | 5/2012 | van Loon | ............ | H04L 12/1886 |
| | | | | 370/252 |
| 2012/0109800 A1* | 5/2012 | Zhou | ............... | G06Q 30/04 |
| | | | | 705/34 |
| 2012/0113937 A1* | 5/2012 | Aramoto | ............... | H04W 8/082 |
| | | | | 370/329 |
| 2012/0117235 A1* | 5/2012 | Castro Castro | ......... | H04L 12/14 |
| | | | | 709/224 |
| 2012/0124229 A1* | 5/2012 | Sahu | ............... | H04W 76/02 |
| | | | | 709/228 |
| 2012/0140665 A1* | 6/2012 | Li | ............... | H04L 47/781 |
| | | | | 370/252 |
| 2012/0149348 A1* | 6/2012 | Patel | ............... | H04L 12/1822 |
| | | | | 455/416 |
| 2012/0155391 A1* | 6/2012 | Kim | ............... | H04W 4/005 |
| | | | | 370/328 |
| 2012/0170501 A1 | 7/2012 | Drozt et al. | | |
| 2012/0182859 A1* | 7/2012 | Ikeda | ............... | H04L 1/1835 |
| | | | | 370/216 |
| 2012/0184266 A1* | 7/2012 | Faccin | ............... | H04W 48/08 |
| | | | | 455/426.1 |
| 2012/0202491 A1* | 8/2012 | Fox | ............... | H04B 7/2609 |
| | | | | 455/435.1 |
| 2012/0207129 A1* | 8/2012 | Sun | ............... | H04W 76/18 |
| | | | | 370/331 |
| 2012/0275348 A1* | 11/2012 | Zhou | ............... | H04L 12/14 |
| | | | | 370/259 |
| 2012/0281685 A1* | 11/2012 | Kotecha | ............... | H04W 76/20 |
| | | | | 370/338 |
| 2012/0297074 A1* | 11/2012 | Mo | ............... | H04W 76/02 |
| | | | | 709/227 |
| 2012/0307798 A1* | 12/2012 | Zhou | ............... | H04W 4/00 |
| | | | | 370/331 |
| 2013/0007257 A1* | 1/2013 | Ramaraj | ............... | H04L 63/0263 |
| | | | | 709/224 |
| 2013/0007286 A1* | 1/2013 | Mehta | ............... | H04W 76/02 |
| | | | | 709/227 |
| 2013/0007287 A1* | 1/2013 | Chu | ............... | H04L 12/189 |
| | | | | 709/227 |
| 2013/0036211 A1* | 2/2013 | Messer | ............... | H04W 4/06 |
| | | | | 709/223 |
| 2013/0044669 A1* | 2/2013 | Song | ............... | H04L 12/189 |
| | | | | 370/312 |
| 2013/0155948 A1* | 6/2013 | Pinheiro | ............... | H04W 4/005 |
| | | | | 370/328 |
| 2014/0003357 A1* | 1/2014 | Ejzak | ............... | H04W 76/022 |
| | | | | 370/329 |

FOREIGN PATENT DOCUMENTS

| | | |
|---|---|---|
| CA | 2823136 A1 | 7/2012 |
| CN | 102014343 A | 4/2011 |
| CN | 102075872 A | 5/2011 |
| KR | 10-2009-0053786 A | 5/2009 |
| KR | 10-0953453 B1 | 4/2010 |
| KR | 10-2010-0087363 A | 8/2010 |
| KR | 10-2012-0022022 A | 3/2012 |

\* cited by examiner

METHOD AND APPARATUS FOR SETTING GROUP-BASED CONNECTION

TECHNICAL FIELD

The present invention relates to a method and apparatus for setting a group-based connection in a wireless communication system.

BACKGROUND ART

Occasionally, an operator or the third party service provider provides the same service to a plurality of devices. For example, an electric power company may send simultaneously, to electric meters distributed in a certain area, a request to transmit the amount of electricity used to a company server. Additionally, in case a specific area has enough network resources, the operator may transmit simultaneously data for software upgrade to a plurality of devices. In this case, most services do not charge users, but make the operator or service provider pay for use of data.

Therefore, for such transmission, there is a discussion about grouping many devices, creating a bearer shared in a group, and saving network resources. Further, a network resource use for such a service needs to be handled differently from that for a normal user service. In an EPS (Evolved Packet System) concerned with this invention, a scheme of allocating such a group to an APN (Access Point Name) has been discussed. Namely, when a group application is executed, a device performs a connection with the APN for the relevant group.

However, one device may belong to two or more groups. For example, a certain device may belong to both a group managed by an electric power company and a group managed to update software by an operator. In this case, an electric power company server can be accessed by "electric power company APN", and an operator software update server can be accessed by "operator dedicated APN". Therefore, when respective group applications are executed at the same time, the device establishes a PDN (Packet Data Network) connection with "electric power company APN" and also establishes an additional PDN connection with "operator dedicated APN". In other words, two IP (Internet Protocol) addresses are allocated for a group service.

Accordingly, in case of managing a separate group for each APN, an operator has difficulty in managing network resources. Thus, needed is a scheme of using a single group APN to provide a service to a device belonging to a plurality of groups. Additionally, the amount of network resources used for such a group service needs to be handled differently from the amount of resources used in case a user subscribes for a non-group service (e.g., UE-AMBR (Aggregate Maximum Bit Rate)).

DISCLOSURE OF INVENTION

Technical Problem

In order to obviate the above issues, the present invention is to effectively provide a service to a device.

Solution to Problem

According to an embodiment of the present invention, a method for setting a connection of a network entity may include steps of receiving a request including at least one packet filter from user equipment (UE); obtaining a group identifier corresponding to the packet filter by using the packet filter; creating a group bearer corresponding to the group identifier if the group bearer corresponding to the group identifier does not exist; and performing allocation such that a communication corresponding to the request is performed through the created group bearer.

According to an embodiment of the present invention, a network entity may include a communication unit configured to receive a request including at least one packet filter from user equipment (UE); and a control unit configured to obtain a group identifier corresponding to the packet filter by using the packet filter, to create a group bearer corresponding to the group identifier if the group bearer corresponding to the group identifier does not exist, and to perform allocation such that a communication corresponding to the request is performed through the created group bearer.

According to an embodiment of the present invention, a method for setting a connection of a network entity may include steps of receiving a request including at least one packet filter from other network entity; obtaining a group identifier corresponding to the packet filter by using the packet filter; obtaining a group PCC (Policy and Charging Control) rule corresponding to the group identifier; and transmitting the obtained group identifier and the PCC rule to the other network entity.

According to an embodiment of the present invention, a network entity may include a communication unit configured to receive a request including at least one packet filter from other network entity; and a control unit configured to obtain a group identifier corresponding to the packet filter by using the packet filter, and to obtain a group PCC (Policy and Charging Control) rule corresponding to the group identifier. The communication unit may be further configured to transmit the obtained group identifier and the PCC rule to the other network entity.

Advantageous Effects of Invention

According to this invention, by effectively providing a service to a device, resources consumed in the network can be saved.

MODE FOR THE INVENTION

Hereinafter, various embodiments of the present invention will be fully described with reference to the accompanying drawings. Furthermore, well known or widely used techniques, elements, structures, and processes may not be described or illustrated in detail to avoid obscuring the essence of the present invention.

Even though the following description of embodiments will focus on an EPS (Evolved Packet System), the present invention may be applicable to any other communication system having similar technical background as understood to those skilled in the art.

Figure 1:
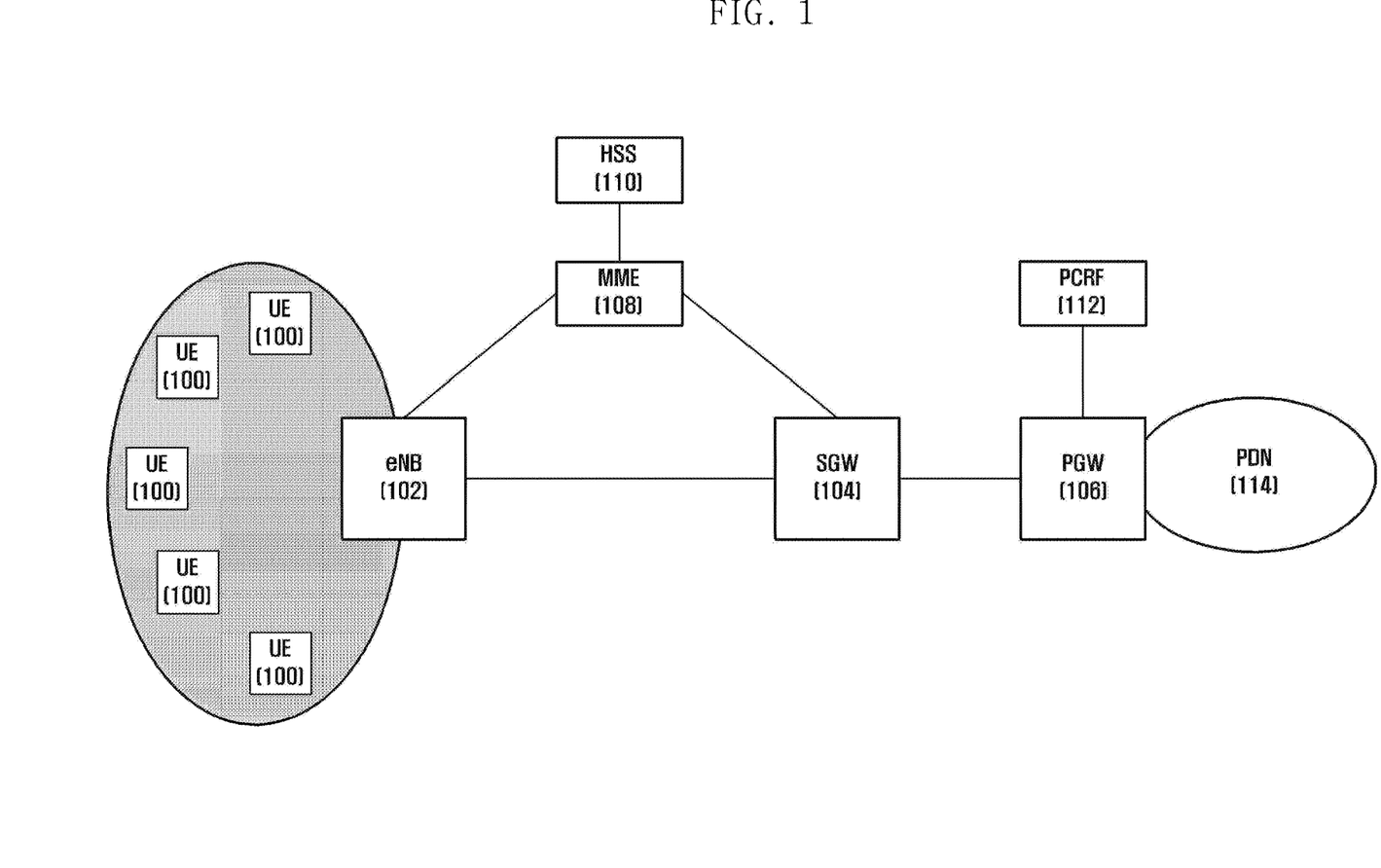
FIG. 1 is a schematic diagram illustrating a structure of an EPS in accordance with an embodiment of the present invention.

FIG. 1 is a schematic diagram illustrating a structure of an EPS in accordance with an embodiment of the present invention.

FIG. 1 shows entities only associated with an embodiment among all entities constituting the EPS. Although not shown, other additional entities may be contained in the EPS. Further, the following description about entities will focus on some of this invention and any other function of such entities may be included.

Referring to FIG. 1, the EPS in an embodiment of this invention includes UE (User Equipment) 100, eNB (evolved Node B) 102, SGW (Serving Gateway) 104, PGW (PDN Gateway) 106, MME (Mobility Management Entity) 108, HSS (Home Subscriber Server) 110, PCRF (Policy Control and Charging Rules Function) 112, and PDN 114. The eNB 102 is an entity for controlling wireless resources and connected with the UE 100 through a wireless channel. The MME 108 manages the UE 100 of an idle mode and performs roaming and authentication related functions of the UE 100. Also the MME 108 processes a bearer signal generated from the UE 100. The HSS 110 stores therein subscription information about each UE 100. When the UE 100 attaches to a network, the HSS 110 transfers UE-related information to the MME 108 so that the MME 108 can use such information to control the UE 100.

The SGW 104 manages a data bearer of the UE 100 and, when data arrives at the UE, notifies it to the MME 108. The S1-U data bearer for transmitting data is established between the eNB 102 and the SGW 104. The PGW 106 receives data, to be transferred to the UE 100, from a service network or receives data, to be transferred to the service network, from the UE. Additionally, the PGW 106 has policies for processing such data. The S5 data bearer for transmitting data is established between the SGW 104 and the PGW 106. The PDN 114 is a network, such as an internet network, an operator dedicated network, an IMS (IP multimedia subsystem) network, or the like, for providing a service to the UE 100.

In the EPS shown in FIG. 1, for transmission and reception of data, the UE 100 establishes a radio bearer with the eNB 102. Also, a data bearer is established between the eNB 102, the SGW 104 and the PGW 106. Therefore, a connection is established between the UE 100 and the PDN 114.

In this embodiment, each of the UE 100, the eNB 102, the SGW 104, the PGW 106, the MME 108, the HSS 110 and the PCRF 112 may include a transceiver unit for transmitting or receiving data to or from other element, and a control unit for controlling the operation of respective elements including the transceiver unit.

The above-discussed configuration in FIG. 1 is only shown according to one embodiment of the present invention. In an alternative embodiment, instead of the PGW 106, any other network entity or upper node may perform the same or similar function as that of the PGW 106. Additionally, instead of the PCRF 112, any other network entity or auxiliary node may perform the same or similar function as that of the PCRF 112. The following description will use the configuration shown in FIG. 1.

Figure 2:
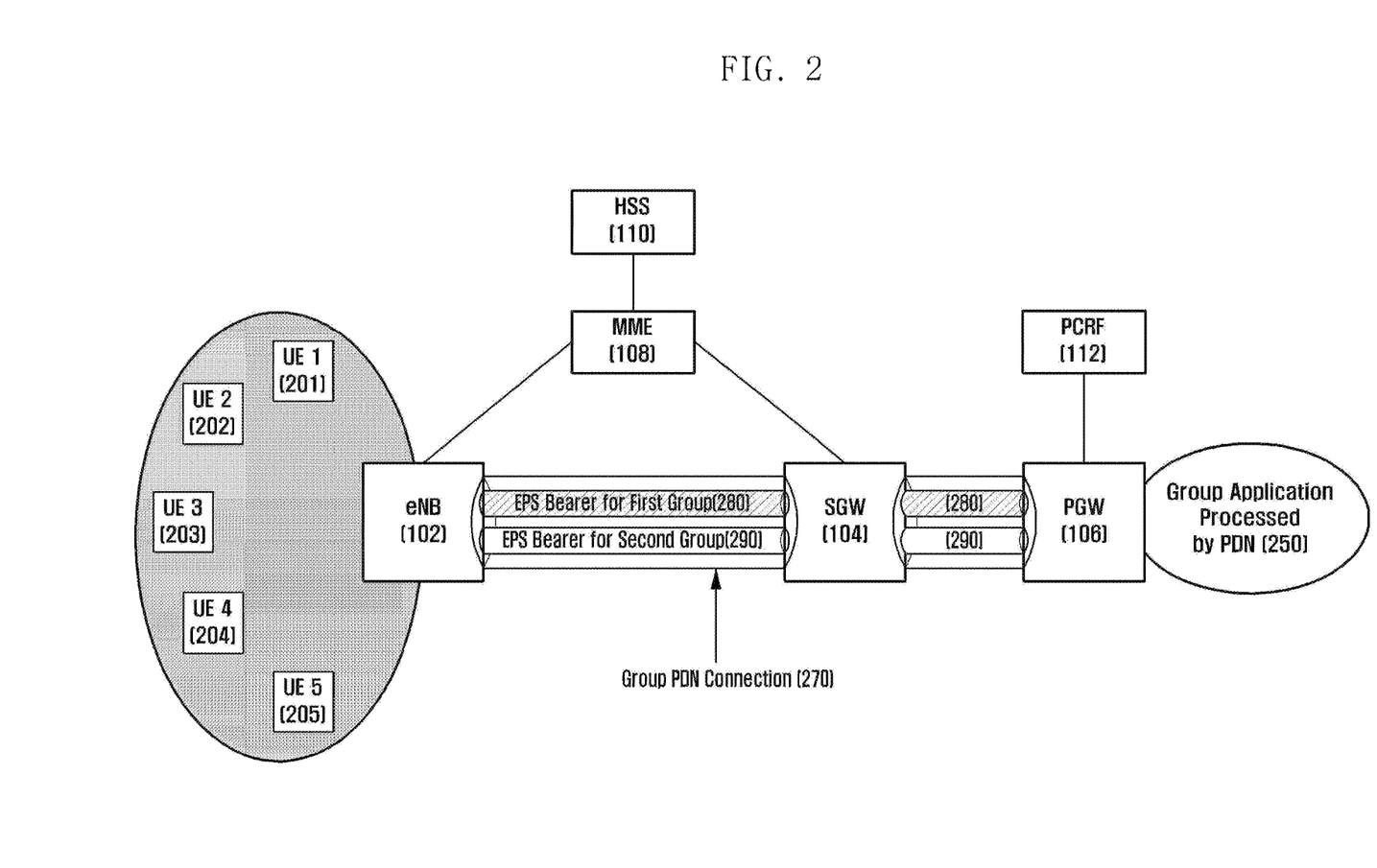
FIG. 2 is a schematic diagram illustrating a structure of a bearer in accordance with an embodiment of the present invention.

FIG. 2 is a schematic diagram illustrating a structure of a bearer in accordance with an embodiment of the present invention.

Referring to FIG. 2, for a group service, UEs 201, 202, 203, 204 and 205 connected to the eNB 102 share a group PDN connection between the eNB 102, the SGW 104 and the PGW 106. Also, the UEs share a group bearer for each group in the group PDN connection. The eNB 102 transmits data to the UEs 201, 202, 203, 204 and 205 in a broadcast manner.

The UEs 201, 202, 203, 204 and 205 establish the group PDN connection using a group APN through an attach process or a PDN connectivity request process performed when a group application is executed. Then the UEs 201, 202, 203, 204 and 205 request a group bearer through a bearer resource modification process. In this embodiment, the group bearer is a dedicated bearer.

In the attach process, the UE accesses the EPS and receives an assigned IP address. The UE establishes a PDN connection with a default APN set by an operator. Through the attach process, a default bearer for the PDN connection is created. The default bearer is basically used for data transmission by the PDN connection. All data which are not determined to use a specific bearer through a packet filter or the like are transmitted through the default bearer. Such a specific bearer determined to be used is referred to as a dedicated bearer.

In the PDN connectivity request process, the UE establishes an additional PDN connection with a desired APN. As the result of the PDN connectivity request, a default bearer for this PDN connection is created.

The first UE 201 tries to access the network for a service of the first group. If the first UE 201 is the initial access UE that requests a group service from the eNB 102, the first UE 201 establishes a group PDN connection 270 and requests an EPS bearer 280 for the first group. Thereafter, if the second UE 202 requests a service of the first group, the network allocates the created group PDN connection 270 and the EPS bearer 280 for the first group to the second UE 202. If the second UE 202 tries an initial access for a service of the second group, the second UE 202 creates an EPS bearer 290 for the second group in the group PDN connection 270. In this way, a group bearer is shared among UEs that desire a group service.

To allocate a group bearer of the existing group PDN connection to the second UE 202 or the third UE 203, the network may use a way of allocating a TEID (Tunnel Endpoint Identifier) of the created group bearer when the second UE 202 or the third UE 203 requests a group bearer.

The UE performs a bearer resource modification for requesting a group bearer, and the following function is added to EPS entities so that the network determines whether to create a new group bearer or allocate the created group bearer.

The UE 201-205 may execute a group application, create packet filter(s) for a group of the executed application, and also request a group bearer by transferring a bearer resource modification message containing the created packet filter to the network.

The packet filter is composed of IP 5-tuple, namely, a source address, a destination address, a source port, a destination port, and an IP version. The packet filter is installed in the UE 201-205 and the PGW 106. In case data/packet meets requirements of the packet filter, the UE 201-205 and/or the PGW 106 transmit data to a bearer determined according to the requirements. Namely, the packet filter is a condition of mapping an application and an EPS bearer.

The packet filter(s) corresponding to each group application may have been already stored in the UE 201-205 and may be created arbitrarily or in response to an input or control signal by the UE 201-205.

The MME 108 manages a bearer corresponding to each group.

When a bearer creation request for a group APN is received from the PGW 106, the MME 108 ascertains whether a bearer for the relevant group exists. Group APN information may be obtained from subscription information of the UE or obtained using a value contained in the request of the UE. Also, through subscription information, the MME 108 may ascertain whether the UE belongs to the relevant group. If no bearer for the relevant group exists, namely if the relevant group is a new group, group APN-AMBR is not included in calculating UE-AMBR of the UE 201-205. The group APN-AMBR is contained in subscription data of the UE. A value other than the group APN-AMBR may be used for the same function.

The UE-AMBR (per UE Aggregate Maximum Bit Rate) is the sum of maximum bit rates the UE can use.

The MME 108 may ascertain the existence or nonexistence of the group through a group identifier contained in the bearer creation request message received from the PGW 106. The group identifier is an identity for indicating a group and is determined by an operator or the third party service provider. Referring to FIG. 2, the first group and the second group are group identifiers.

The eNB 102 may ascertain whether the relevant bearer is a group bearer. In some embodiments, the eNB 102 may ascertain whether the relevant bearer is a group bearer, based on a group identifier transmitted from the MME 108. In some embodiments, the eNB 102 may adjust the resource allocation to a group bearer according to operator's policy. For example, in case of a heavy radio load, the eNB 102 may reduce the resource allocation to a group bearer according to operator's policy.

According to the first embodiment, the PGW 106 may store therein a list, or any other data structure, of mapping relations between a group identifier and information (e.g., a destination address) contained in packet filter(s) transmitted by the first UE 201. This list may be created by an operator.

According to the first embodiment, in case the first UE 201 requests a bearer resource modification through the group PDN connection, the PGW 106 may obtain a group identifier of a service, requested by the first UE 201, by utilizing the stored list based on information (e.g., a destination address) contained in packet filter(s).

According to the first embodiment, in case there is a group identifier corresponding to packet filter(s) requested by the first UE 201, the PGW 106 always interacts with the PCRF 112. In case there is no group identifier corresponding to the relevant packet filter(s), interaction between the PGW 106 and the PCRF 112 is optional.

According to the first embodiment, the PCRF 112 ascertains subscription for a group of a service provider or the first UE 201 and determines a group PCC (Policy and Charging Control) rule, based on packet filter(s), a group identifier, etc. transmitted by the first UE 201. The group PCC rule contains a charging identity for a group.

According to the second embodiment, the PGW 106 stores a group PCC rule corresponding to each group identifier. The group PCC rule contains a charging identity for a group.

According to the second embodiment, the PGW 106 applies the group PCC rule corresponding to the relevant group identifier for each group.

According to the second embodiment, in case there is no group bearer corresponding to the group identifier, the PGW 106 creates a new bearer regardless of whether bearer QoS (Quality of Service) requested by the first UE 201 through a bearer resource modification is mapped with one of bearers in the first UE 201. This is different from a case of not using a group based method in which the PGW 106 allocates an existing bearer when the bearer QoS requested through a bearer resource modification is satisfied with an existing bearer in the first UE 201.

In case there is a group bearer corresponding to the group identifier, the PGW 106 allocates the existing group bearer and PCC rule of the relevant group to the first UE 201.

According to the third embodiment, the PCRF 112 stores a list of mapping relations between a group identifier and a destination address sent by the first UE 201. This list may be offered by an operator.

According to the third embodiment, the PCRF 112 may obtain a group identifier of a service, requested by the first UE 201, by utilizing the stored list based on a destination address of packet filter(s) requested by the first UE 201.

According to the third embodiment, the PCRF 112 ascertains subscription for a group of a service provider or the first UE 201 and determines a group PCC rule, based on packet filter(s), a group identifier, etc. transmitted by the first UE 201. The group PCC rule contains a charging identity for a group.

Figure 3:
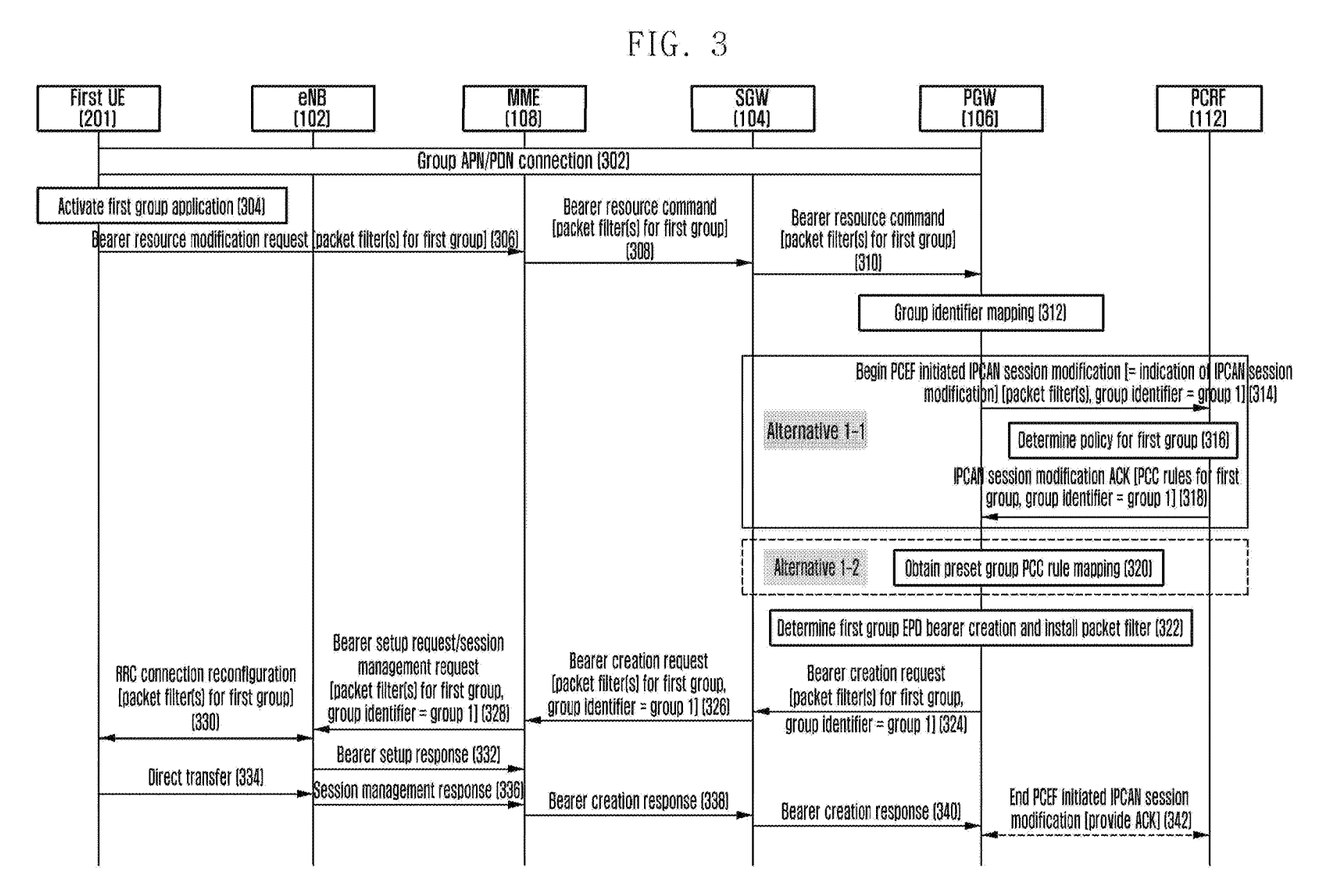
FIG. 3 is a flow diagram illustrating a process of creating a group bearer of the first UE in accordance with the first or second embodiment of the present invention.

FIG. 3 is a flow diagram illustrating a process of creating a group bearer of the first UE in accordance with the first or second embodiment of the present invention.

Referring to FIG. 3, steps 302 to 312 are applied to both the first and second embodiments.

At step 302, the first UE 201 creates a group PDN connection through an attach process or a PDN connection request process.

At step 304, the first UE 201 activates (i.e., executes) an application of the first group.

At step 306, the first UE 201 transmits a bearer resource modification request message to the MME 108. The bearer resource modification request message contains packet filter(s) for the first group.

At step 308, the MME 108 transmits the received bearer resource modification request message to the SGW 104. The bearer resource modification request message contains packet filter(s) for the first group.

At step 310, the SGW 104 transmits the received bearer resource modification request message to the PGW 106. The bearer resource modification request message contains packet filter(s) for the first group. The bearer resource modification request message at step 310 may have the form of a bearer resource command.

At step 312, based on information (e.g., a destination address) stored in the packet filter(s) and utilizing a stored list, the PGW 106 ascertains that a group identifier corresponding to the packet filter(s) requested by the first UE 201 is the first group. Namely, the PGW 106 obtains a group identifier (group 1) corresponding to the packet filter(s). This embodiment supposes that a group PDN connection corresponding to the first group does not exist. Therefore, the PGW 106 ascertains that there is no group PDN connection corresponding to the first group.

Steps 314 to 318 (alternative 1-1) are applied to the first embodiment. In case steps 314 to 318 are performed, step 320 associated with the second embodiment may be skipped.

At step 314, the PGW 106 transfers the group identifier (group 1) obtained at step 312 and the packet filter(s) received at step 310 to the PCRF 112. Group 1 indicates the group identifier of the first group. Information transfer at step 314 may be performed through, e.g., a PCEF (Policy and Charging Enforcement Function) initiated IP-CAN session modification begin message, namely, an indication message of IP-CAN session modification. The PCEF initiated IP-CAN session modification begin message contains the group identifier and the packet filter(s).

At step 316, the PCRF 112 determines a PCC rule of the first group, using information transferred at step 314.

At step 318, the PCRF 112 transfers the PCC rule created at step 316 for the first group to the PGW 106.

Step 320 is applied to the second embodiment. In case step 320 is performed, steps 314 to 318 associated with the first embodiment may be skipped.

At step 320, the PGW 106 determines to apply a pre-stored PCC rule for the first group, based on the group identifier obtained at step 312.

Steps 322 to 342 may be applied to both the first and second embodiments. At step 322, the PGW 106 determines the creation of a group bearer for the first group and then creates the bearer. Also, the PGW 106 installs packet filter(s) for the first group according to the PCC rule corresponding to the first group.

At step 324, the PGW 106 transfers a bearer creation request message to the SGW 104. The bearer creation request message contains the packet filter(s) for the first group and the group identifier (group 1). At step 324, the packet filter(s) for the first group may be identical to the packet filter(s) for the first group transmitted by the first UE 201 at step 306 or varied according to the PCC rule corresponding to the first group. In some embodiments, the group identifier may be contained in the packet filter.

At step 326, the SGW 104 transfers the bearer creation request message to the MME 108. As mentioned at step 324, the bearer creation request message contains the packet filter(s) for the first group and the group identifier (group 1).

At step 328, the MME 108 transfers a bearer setup request/session management request message to the eNB 102. The bearer setup request/session management request message contains the packet filter(s) for the first group and the group identifier (group 1). The MME 108 ascertains that a group bearer for the received group identifier (group 1) does not exist, and therefore creates a bearer of the first group (i.e., the first group bearer). Also, the MME 108 stores in UE context so that UE-AMBR of the UEs using the first group bearer may not contain the maximum bit rate due to use of the group bearer. Namely, the MME 108 excludes group APN-AMBR from calculating UE-AMBR.

At step 330, the eNB 102 transfers the packet filter(s) to the first UE 201 in a typical manner. For example, the eNB 102 may transfer the packet filter(s) for the first group through the RRC connection reconfiguration process.

Steps 332 to 342 indicate the remaining steps of a typical bearer resource modification process of the EPS. At step 332, the eNB 102 transmits a bearer setup response message to the MME 108. At step 334, the first UE 201 performs a direct transfer to the eNB 102. At step 336, the eNB 102 transmits a session management response message to the MME 108. At step 338, the MME 108 transmits a bearer creation response message to the SGW 104. At step 340, the SGW 104 transmits the bearer creation response message to the PGW 106. At step 342, the PGW 106 performs, together with the PCRF 112, a PCEF initiated IP-CAN session modification end process, namely, a provision ACK process.

The packet filter(s) transferred at steps 306 and 324 may be contained in TFT (Traffic Flow Template), for example.

Figure 4:
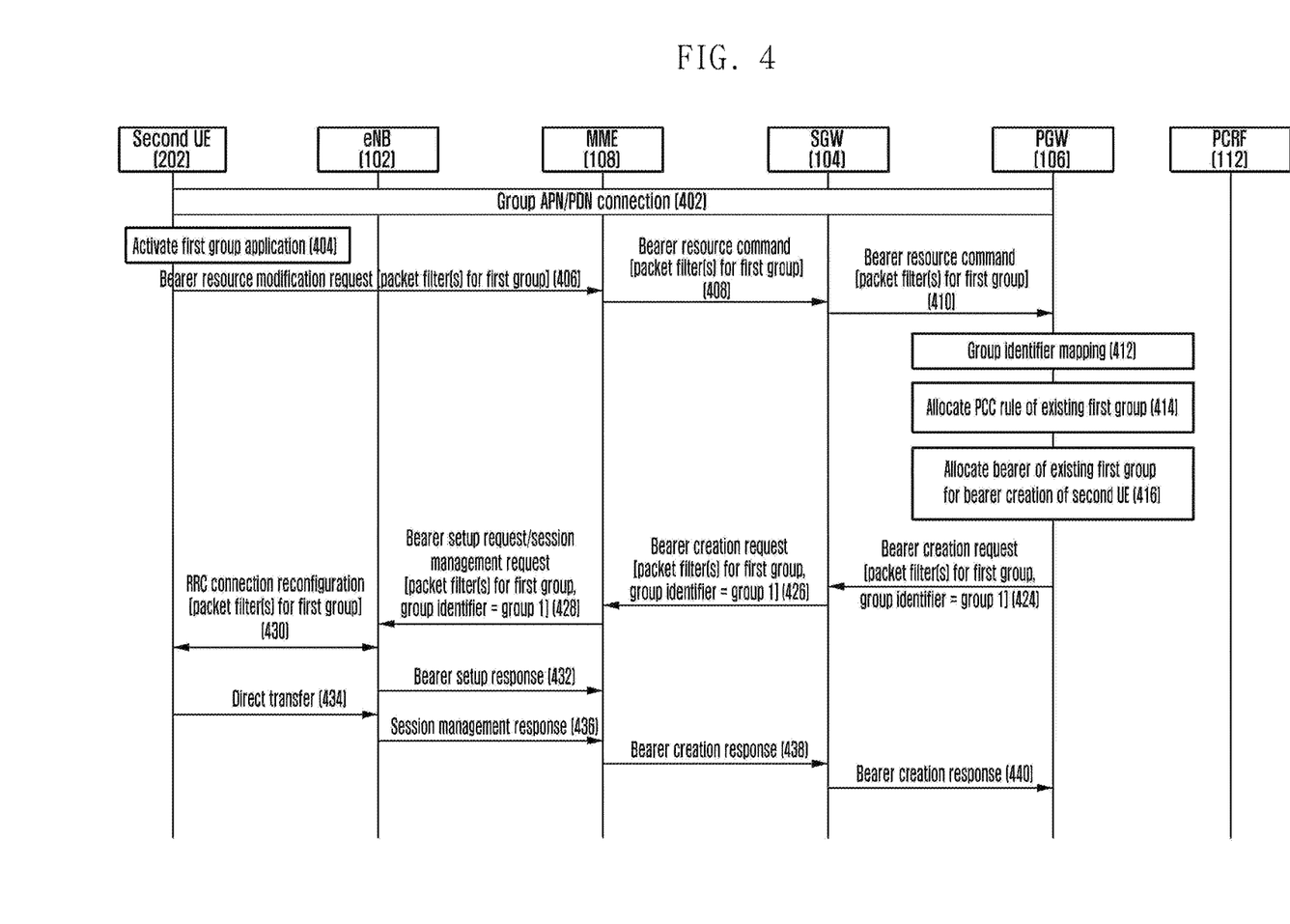
FIG. 4 is a flow diagram illustrating a process of allocating a group bearer to the second UE in accordance with the first and second embodiments of the present invention.

FIG. 4 is a flow diagram illustrating a process of allocating a group bearer to the second UE in accordance with the first and second embodiments of the present invention.

Referring to FIG. 4, since steps 402 to 410 are identical to or correspond to steps 302 to 310 in FIG. 3, detailed descriptions thereof will be skipped.

At step 412, based on information (e.g., a destination address) contained in the packet filter(s) and utilizing a pre-stored list, the PGW 106 ascertains that a group identifier for the packet filter(s) requested by the second UE 202 is the first group. Namely, the PGW 106 obtains a group identifier (group 1) corresponding to the packet filter(s). Therefore, the PGW 106 can ascertain the existence of a group PDN connection and a group bearer of the first group.

At step 414, the PGW 106 ascertains that a PCC rule corresponding to the first group can be used as it is, and therefore allocates the PCC rule of the first group to a request of the second UE 202.

At step 416, the PGW 106 determines to allocate the existing bearer of the first group in response to a bearer resource modification request of the second UE 202, and thus allocates a bearer of the first group.

Since steps 424 to 440 are identical to steps 324 to 340 in FIG. 3, detailed descriptions thereof will be skipped.

Figure 5:
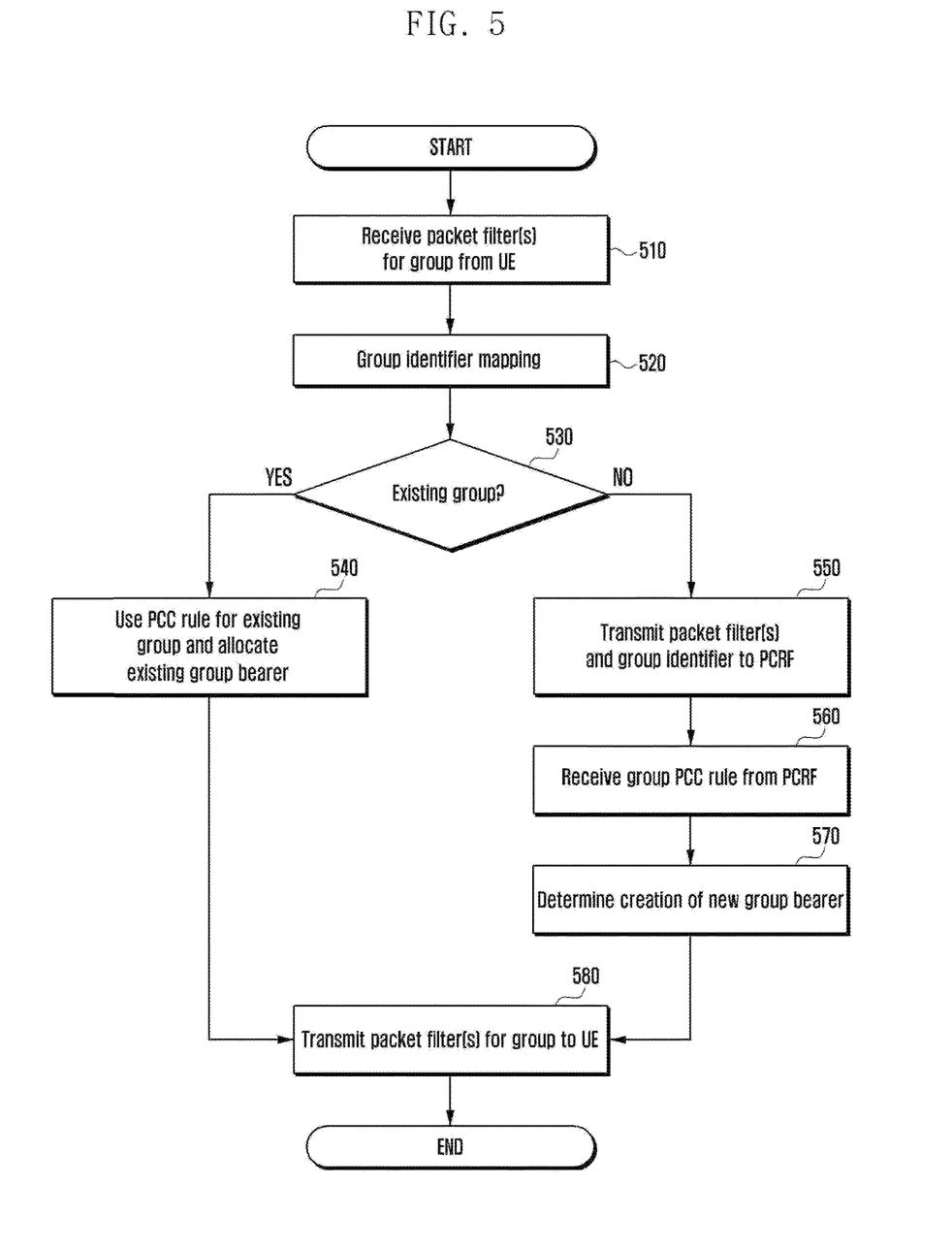
FIG. 5 is a flow diagram illustrating operations of PGW in accordance with the first embodiment of the present invention.

FIG. 5 is a flow diagram illustrating operations of PGW in accordance with the first embodiment of the present invention.

Referring to FIG. 5, at step 510, the PGW 106 receives packet filter(s) for a group, e.g., the first group, from a device (e.g., the first UE 201). At step 520, based on information (e.g., a destination address) stored in the packet filter(s) and utilizing a stored list, the PGW 106 ascertains that a group identifier corresponding to the packet filter(s) requested by the first UE 201 is the first group (group 1).

At step 530, the PGW 106 determines whether the ascertained group has already had a connection thereof, namely whether a PCC rule for the group has been obtained and also a group bearer of the group has been created. If a connection of the group exists, step 540 will be performed. At step 540, the PGW 106 determines to use a PCC rule for the existing group (the first group) in response to the connection request and allocates a group bearer corresponding to the group (the first group) to the request.

If it is determined at step 530 that the identified group has no connection thereof, step 550 will be performed. At step 550, the PGW 106 transmits the packet filter(s) of step 510 and the ascertained group identifier (group 1) to the PCRF 112. At step 560, the PGW 106 receives, as a response to a transmitted message, a group PCC rule of the group from the PCRF 112. At step 570, the PGW 106 determines the creation of a new group bearer for the group and thus creates a group bearer. At step 570, the created new group bearer is allocated in response to the request.

At step 580, the PGW 106 transmits the packet filter(s) for the group (group 1) to the first UE 201.

Figure 6:
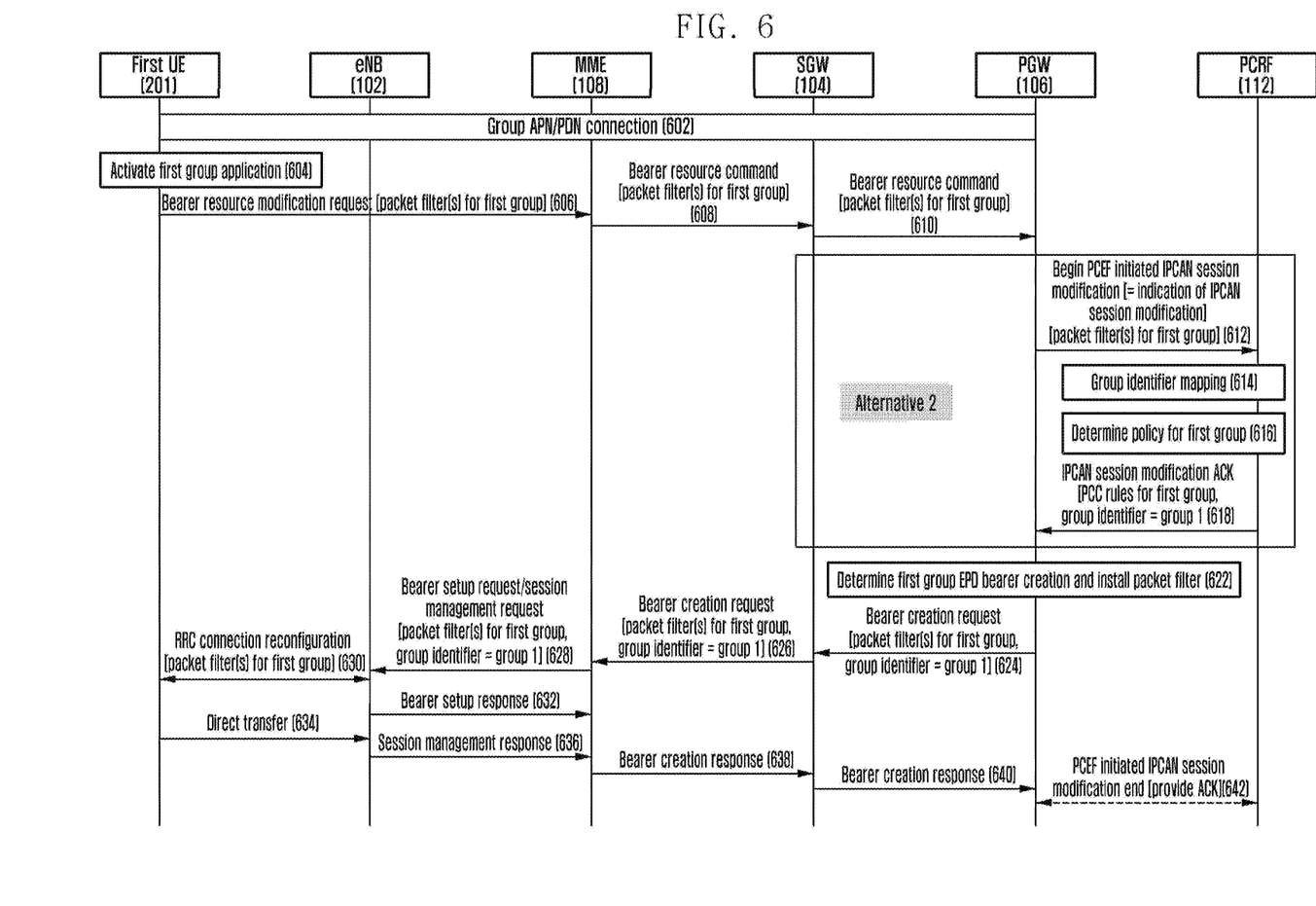
FIG. 6 is a flow diagram illustrating a process of creating a group bearer in accordance with the third embodiment of the present invention.

FIG. 6 is a flow diagram illustrating a process of creating a group bearer in accordance with the third embodiment of the present invention.

Referring to FIG. 6, since steps 602 to 610 are identical to steps 302 to 310 in FIG. 3, detailed descriptions thereof will be skipped.

At step 612, the PGW 106 transfers the packet filter(s), received at step 610, for the first group to the PCRF 112.

At step 614, based on information (e.g., a destination address) contained in the packet filter(s) and utilizing a pre-stored list, the PCRF 112 ascertains that a group identifier for the packet filter(s) requested by the first UE 201 corresponds to the first group. Namely, the PCRF 112 obtains a group identifier (group 1) corresponding to the packet filter(s).

At step 616, PCRF 112 creates a PCC rule of the obtained group identifier (group 1).

At step 618, the PCRF 112 transfers, to the PGW 106, the group identifier (group 1) obtained at step 614 and the PCC rule for the first group created at step 616.

At step 622, the PGW 106 ascertains that a group bearer corresponding to the obtained first group does not exist, and then creates a group bearer corresponding to the first group. Also, the PGW 106 installs the packet filter(s) for the first group according to the first group PCC rule.

Since steps 624 to 642 are identical to steps 324 to 342 in FIG. 3, detailed descriptions thereof will be skipped.

Even in case of the third embodiment, when the second UE 202 requests a group bearer for the first group through a bearer resource modification process, the PCRF 112 ascertains at step 614 that the request is for the first group having a group bearer, and transfers a PCC rule of the first group as well as the group identifier (group 1) to the PGW 106. Alternatively, the PCRF 112 may transfer only the group identifier (group 1), and the PGW 106 may use a PCC rule of the first group as it is. Thereafter, the PGW 106 may allocate a bearer of the first group to the second UE.

The above-discussed method is described herein with reference to flowchart illustrations of user interfaces, methods, and computer program products according to embodiments of the present disclosure. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which are executed via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "unit", as used herein, may refer to a software or hardware component or device, such as a Field Programmable Gate Array (FPGA) or Application Specific Integrated Circuit (ASIC), which performs certain tasks. A unit may be configured to reside on an addressable storage medium and configured to execute on one or more processors. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules/units may be combined into fewer components and modules/units or further separated into additional components and modules.

The embodiments described above are illustrative examples and it should not be construed that the present invention is limited to these particular embodiments. Thus, various changes and modifications may be effected by one skilled in the art without departing from the spirit or scope of the invention as defined in the appended claims.

While this disclosure has been particularly shown and described with reference to an exemplary embodiment thereof, it will be understood by those skilled in the art that various changes in form and details may be made therein without departing from the spirit and scope of this disclosure as defined by the appended claims.

The invention claimed is:

1. A method for establishing a connection of a network entity, the method comprising:

establishing, based on a single access point name (APN), one connection for a plurality of packet data networks (PDNs) for a plurality of groups with respect to a plurality of user equipments (UEs) connected to a base station, the single APN being configured for the plurality of the PDNs;

receiving, from a first UE, a first request message through the one connection in response to a first application being executed at the first UE, the first request message including a packet filter comprising a destination address;

obtaining a first group identifier for a first group based on the first application, the packet filter, and a list of group identifiers, each of the group identifiers being mapped to a different destination address;

identifying whether a first group bearer corresponding to the first group identifier exists;

establishing the first group bearer within the one connection when the first group bearer corresponding to the first group identifier does not exist, receiving, from a second UE, a second request message through the one connection;

assigning the second UE to the first group bearer when the second request message is associated with the first application; and establishing a second group bearer within the one connection when the second request message is associated with a second application different from the first application, wherein data not scheduled to be communicated to the first UE or the second UE over the first group bearer or the second group bearer is communicated over a default bearer established within the group PDN connection, and wherein a UE aggregate maximum bit rate (AMBR) of the UE is calculated by excluding an AMBR associated with a group bearer.

2. The method of claim 1, further comprising:
obtaining a group policy and charging control (PCC) rule corresponding to the first group identifier from a data structure stored in the network entity;
installing the packet filter according to the group PCC rule; and
transferring the packet filter to the first UE.

3. The method of claim 1, further comprising:
transmitting the first group identifier to a node;
receiving a group policy and charging control (PCC) rule corresponding to the first group identifier from the node;
installing the packet filter according to the group PCC rule; and
transferring the packet filter to the first UE.

4. The method of claim 1, further comprising:
when the first group bearer corresponding to the first group identifier exists, providing a service corresponding to the first request message through the first group bearer corresponding to the first group identifier.

5. The method of claim 1, further comprising transferring the first group identifier to another network entity.

6. The method of claim 5, wherein the other network entity identifies an existence of the first group bearer, based on the transferred first group identifier.

7. The method of claim 5, wherein the other network entity includes at least one of a mobility management entity (MME) and an evolved node B (eNB).

8. A network entity comprising:
a transceiver; and
at least one processor configured to:
  establish, based on a single access point name (APN), one connection for a plurality of packet data networks (PDNs) for a plurality of groups with respect to a plurality of user equipments (UEs) connected to a base station, the single APN being configured for the plurality of the PDNs,
  receive, from a first UE, a first request message through the one connection in response to a first application being executed at the first UE, the first request message including a packet filter comprising a destination address,
  obtain a first group identifier for a first group based on the first application, the packet filter, and a list of group identifiers, each of the group identifiers being mapped to a different destination address,
  identify whether a first group bearer corresponding to the first group identifier exists,
  establish the first group bearer within the one connection when the first group bearer corresponding to the first group identifier does not exist,
  receive, from a second UE, a second request message through the one connection,
  assign the second UE to the first group bearer when the second request message is associated with the first application, and
  establish a second group bearer within the one connection when the second request message is associated with a second application different from the first application, wherein data not scheduled to be communicated to the first UE or the second UE over the first group bearer or the second group bearer is communicated over a default bearer established within the group PDN connection, and wherein a UE aggregate maximum bit rate (AMBR) of the UE is calculated by excluding an AMBR associated with a group bearer.

9. The network entity of claim 8, wherein the at least one processor is further configured to:
obtain a group policy and charging control (PCC) rule corresponding to the first group identifier from a data structure stored in the network entity,
install the packet filter according to the group PCC rule, and
transfer the packet filter to the first UE.

10. The network entity of claim 8,
wherein the at least one processor is further configured to:
transmit the first group identifier to a node,
receive a group policy and charging control (PCC) rule corresponding to the first group identifier from the node,
install the packet filter according to the group PCC rule, and
transfer the packet filter to the first UE.

11. The network entity of claim 8, wherein the at least one processor is further configured to, if the first group bearer corresponding to the first group identifier exists, provide a service corresponding to the first request message through the first group bearer corresponding to the group identifier.

12. The network entity of claim 8, wherein the at least one processor is further configured to transfer the first group identifier to another network entity.

13. The network entity of claim 12, wherein the other network entity is configured to identify an existence of the first group bearer, based on the transferred first group identifier.

14. The network entity of claim 12, wherein the other network entity includes at least one of a mobility management entity (MME) and an evolved node B (eNB).

15. A method for establishing a connection of a network entity, the method comprising:
receiving, from a first user equipment (UE), a first request message in response to a first application being executed at the first UE, the first request message including a packet filter including a destination address;
determining whether a group connection is established in response to receiving the first request message;
obtaining a first group identifier for a group using the first application based on the packet filter and a list of group identifiers, each of the group identifiers being mapped to a different destination address;
determining a group policy and charging control (PCC) rule corresponding to the first group identifier; and
transmitting the obtained first group identifier and the PCC rule to another network entity,
wherein the first group identifier is used to establish a first group bearer when the group connection is established,
wherein the first group bearer is included in the group connection for a plurality of packet data networks (PDNs) for a plurality of groups with respect to a plurality of UEs, and each of the groups corresponding to each of applications includes at least one UE using a same application,
wherein the group connection is established based on a single access point name (APN) configured for the plurality of the PDNs and data not scheduled to be communicated to the plurality of UEs over the first group bearer is communicated over a default bearer established within the group connection, and wherein a UE aggregate maximum bit rate (AMBR) of the UE is calculated by excluding an AMBR associated with a group bearer.

16. The method of claim 15, wherein the another network entity that receives the first group identifier and the PCC rule is configured to:

establish the first group bearer corresponding to the first group identifier when the first group bearer corresponding to the first group identifier does not exist.

17. A network entity comprising:

a transceiver; and at least one processor configured to:

control the transceiver to receive, from a first user equipment (UE), a first request message in response to a first application being executed at the first UE, the first request message including a packet filter including a destination address, determine whether a group connection is established in response to receiving the first request message, obtain a first group identifier for a group using the first application based on the packet filter and a list of group identifiers, each of the group identifiers being mapped to a different destination address, and determine a group policy and charging control (PCC) rule corresponding to the first group identifier, wherein the transceiver is further configured to transmit the obtained first group identifier and the PCC rule to another network entity, wherein the first group identifier is used to establish a first group bearer when the group connection is established, wherein the first group bearer is included in the group connection for a plurality of packet data networks (PDNs) for a plurality of groups with respect to a plurality of UEs, and each of the groups corresponding to each of applications includes at least one UE using a same application, wherein the group connection is established based on a single access point name (APN) configured for the plurality of the PDNs and data not scheduled to be communicated to the plurality of UEs over the first group bearer is communicated over a default bearer established within the group connection, and wherein a UE aggregate maximum bit rate (AMBR) of the UE is calculated by excluding an AMBR associated with a group bearer.

18. The network entity of claim 17, wherein the another network entity that receives the first group identifier and the PCC rule is configured to:

establish the first group bearer corresponding to the first group identifier when the first group bearer corresponding to the first group identifier does not exist.

* * * * *